United States Patent Office.

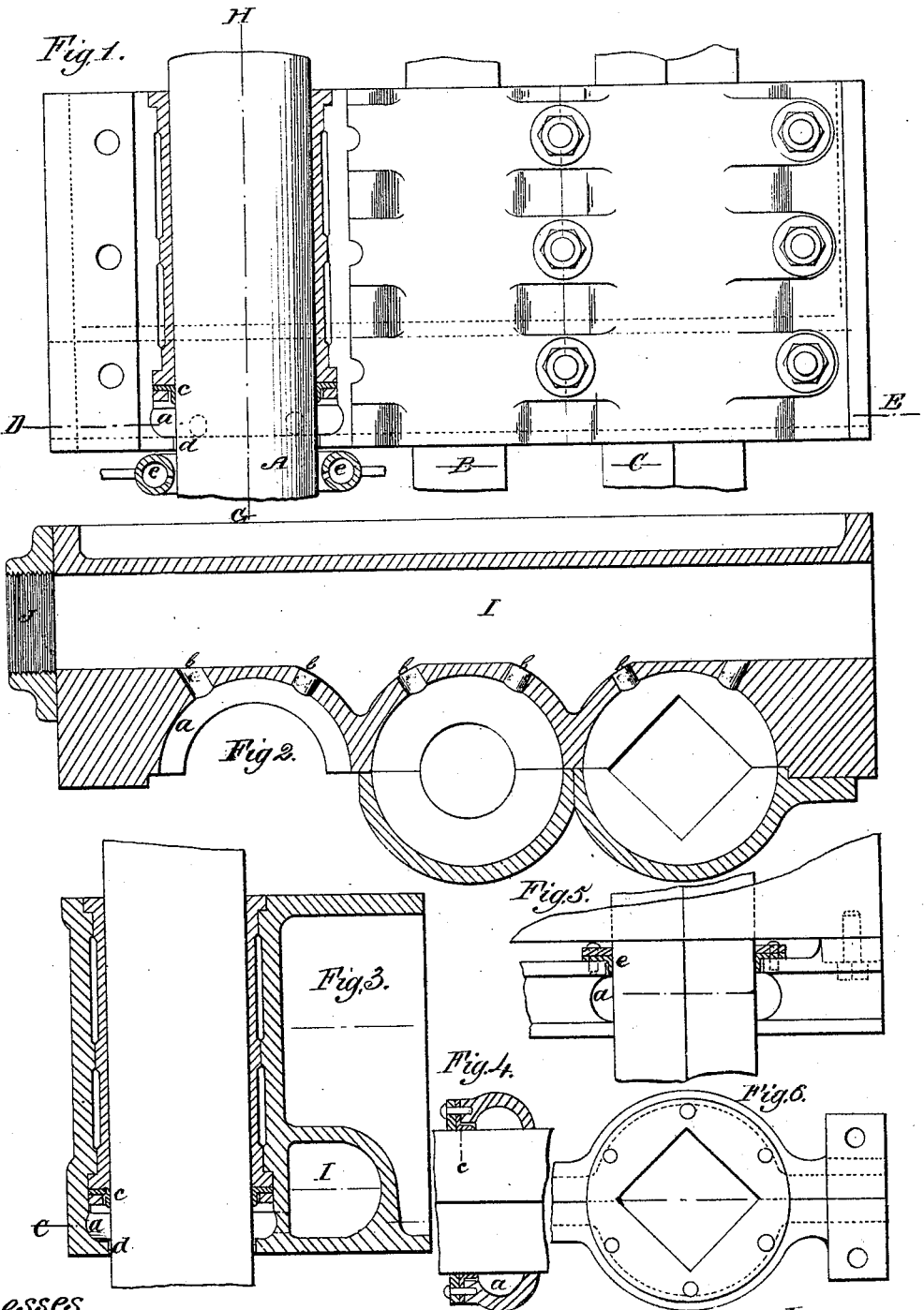

Z. E. COFFIN, OF NEWTON, MASSACHUSETTS.

Letters Patent No. 107,005, dated September 6, 1870; antedated August 24, 1870.

IMPROVEMENT IN DEVICES FOR LUBRICATING, COOLING, AND WASHING VERTICAL HAMMER-SHAFTS OR STAMPS.

The Schedule referred to in these Letters Patent and making part of the same.

I, Z. E. COFFIN, of Newton, in the county of Middlesex and State of Massachusetts, have invented certain Improvements in Stamping-Machines, of which the following is a specification.

Nature and Objects of the Invention.

The nature of my invention relates to the mode and means for supplying water to stamping-machines for the purpose of lubrication and excluding dust, dirt, and heat from the wearing-parts, so reducing friction and supplying water to the material operated on by the stamps, as more fully set forth below.

Description of Drawings.

Figure 1 represents in a sectional elevation a series of stamp-shafts, A B C, and related parts.

Figure 2 is a sectional plan of those related parts.

Figure 3 is a sectional view, embracing one of the stamp-shafts, and is taken transversely to the first.

Figures 4 and 5 illustrate, by sectional views, the application of the improvement to stamps already built without it.

Figure 6 is a plan of the same.

Figure 1 shows, at $e\ e$, a modification of the same, which part is superfluous to the main illustration in that figure.

The stamp-shafts shown are of different varieties of form and size, to show the adaptability of the invention.

A is a large cylindrical shaft;

B is a smaller one of similar form; while

C has a square or angular section.

These stamp-shafts are guided in their up-and-down stamping movement by suitable bearings, such as shown in the drawings, or others of approved construction adapted to the purpose.

These bearings are provided with a water-channel, $a$, so constructed and arranged about the stamp-shaft and provided with an orifice or series of orifices, so arranged as to deliver water into contact with the stamp-shaft upon all sides in suitable quantity to keep it entirely and constantly wet or lubricated when in operation, so far as they come into frictional contact with the bearing.

One entire annular or continuous orifice, as illustrated in figs. 1 and 3, may be used, or a series of small orifices, such as are indicated near $e\ e$, fig. 1, may serve to keep the shaft approximately if not entirely surrounded with flowing water.

For the purpose of supplying water to the channels $a\ a$ or $e\ e$, a pipe or conductor, as I, figs. 2 and 3, or as shown in fig. 6, is arranged to connect these channels directly or indirectly by branches.

Water is supplied to the pipe I by pumps, or by any convenient means affording suitable pressure.

When applied to stamping-machines already built, in which provision has not been made for the application of the improvement, the channels $a$ are made separately from the frame of the machine, as illustrated at $e\ e$, fig. 1, and in figs. 4, 5, and 6.

The bearings above the channels $a$ should, if not of such closeness and length as to prevent the escape of too much water in the upward direction, be provided with some suitable packing for that purpose.

This packing may be of leather or other suitable material, applied in the manner illustrated at $c$, figs. 1 and 3, or in other well-known methods used for similar purposes.

The dust arising from ores and other material in the stamping process, will, by the constant issuing of water from or at the entrance of the bearings on all sides, be prevented from getting into the bearings or guides, the bearings or guides will be kept cool, and the friction and wear will be greatly reduced, while the bearings or guides are thus constantly and effectually lubricated, which also tends directly to the same result. The water so used flows downward to the material in process of stamping, and so furnishes the supply for properly wetting or washing that, as may be required.

Claim.

An annular or horizontal groove in a cylindrical or other-shaped bearing or guide, in which moves vertically a shaft, said groove having a channel or channels for the influx of water under a pressure, the shaft moving loose in its bearing or guide below the said groove or grooves, so as to permit the descent of water sufficient to wash downward all debris and to cool and lubricate the shaft.

Z. E. COFFIN.

Witnesses:
 THOMAS GAUNT,
 ARTHUR A. BURR.